US012810032B2

(12) United States Patent
Jainsky et al.

(10) Patent No.: US 12,810,032 B2
(45) Date of Patent: Nov. 24, 2026

(54) SHORT SIGNATURES AND SHORT AUTHENTICATED SERIAL NUMBERS FOR INTERNET OF THINGS DEVICES

(71) Applicant: Technology Innovation Institute—Sole Proprietorship LLC, Masdar City (AE)

(72) Inventors: Julien Jainsky, Houston, TX (US); David Naccache, Paris (FR); Bassem Ouni, Abu Dhabi (AE)

(73) Assignee: Technology Innovation Institute—Sole Proprietorship LLC, Masdar City (GB)

( * ) Notice: Subject to any disclaimer, the term of this patent is extended or adjusted under 35 U.S.C. 154(b) by 102 days.

(21) Appl. No.: 18/915,780

(22) Filed: Oct. 15, 2024

(65) Prior Publication Data

US 2025/0141694 A1 May 1, 2025

Related U.S. Application Data

(60) Provisional application No. 63/593,328, filed on Oct. 26, 2023.

(51) Int. Cl.

| | |
|---|---|
| ***G06F 21/00*** | (2013.01) |
| ***G06F 21/64*** | (2013.01) |
| ***H04L 9/32*** | (2006.01) |

(52) U.S. Cl.

CPC ............ *G06F 21/64* (2013.01); *H04L 9/3247* (2013.01); *H04L 9/3252* (2013.01)

(58) Field of Classification Search

None

See application file for complete search history.

(56) References Cited

U.S. PATENT DOCUMENTS 7,587,605 B1 * 9/2009 Venkatesan ........... H04L 9/3073 713/180

8,073,139 B2 12/2011 Vanstone et al.

(Continued)

FOREIGN PATENT DOCUMENTS

CA 2308084 A1 * 11/2000 ........... H04L 9/3066

OTHER PUBLICATIONS

Akhmetzy Anov A, L., et al., 'On methods of shortening ElGamal-type signatures.• Cryptology ePrint Archive, Paper 2021/148, 2021 (Received: Feb. 12, 2021). (Year: 2021).*

(Continued)

*Primary Examiner* — Andrew J Steinle

(74) *Attorney, Agent, or Firm* — DLA PIPER LLP (US)

(57) ABSTRACT

A method and system for generating and verifying a digital signature, the method and system comprising sharing, between a signing node and a verifying node, a message in which the signing node is to issue a digital signature, performing, by the signing node, a first number of operations to generate the digital signature featuring a redundancy, generating, by the signing node, a shortened digital signature. The transforming of the digital signature to the shortened digital signature includes omitting the redundancy, transmitting, by the signing node to the verifying node, the shortened digital signature. The verifying node is configured to perform a second number of operations to recover the redundancy and generate the digital signature from the shortened digital signature, and verifying, by the verifying node, the digital signature with respect to the message.

20 Claims, 6 Drawing Sheets

(56) References Cited

U.S. PATENT DOCUMENTS

| | | | | |
|---|---|---|---|---|
| 8,548,165 | B2 * | 10/2013 | Vanstone | H04L 9/3252 713/176 |
| 8,631,240 | B2 | 1/2014 | Vanstone | |
| 2009/0022311 | A1 | 1/2009 | Vanstone et al. | |
| 2010/0023775 | A1 * | 1/2010 | Vanstone | H04L 9/3252 713/176 |
| 2012/0039466 | A1 | 2/2012 | Vanstone et al. | |

OTHER PUBLICATIONS

Pornin, T., 'Truncated EdDSA/ECDSA Signatures.' Cryptology ePrint Archive, Paper 2022/938, 2022 (Received: Jul. 19, 2022. Approved: Jul. 20, 2022). (Year: 2022).*

Naccache, D., et al., 'Signing on a Postcard.' [retrieved from internet on Jan. 23, 2025]. <URL: https://web.archive.org/web/200308 I0091752/http://www.di.ens.fr/-stern/data/St86.pdf> published on Aug. 10, 2003 as per Wayback Machine. (Year: 2003).*

Menezes, A. J., et al., 'Handbook of Applied Cryptography', CRC Press, Boca Raton, 1997, ISBN-13: 978-0-84-938523-0. (Year: 1997).*

Abe, M., et al., 'A signature scheme with message recovery as secure as discrete logarithm.' Lam, KY., Okamoto, E., Xing, C. (eds) Advances in Cryptology—ASIACRYPT'99. ASIACRYPT 1999. Lecture Notes in Computer Science, vol. 1716, 1999: pp. 378-389. (Year: 1999).*

Jainsky, J., et al., 'Authenticating Medications with QR-Codes and Compact Digital Signatures.' Cryptology ePrint Archive, Paper 2023/1817, 2023 (Received: Nov. 24, 2023. Approved: Nov. 27, 2023). (Year: 2023).*

Office Action of AE Application No. P2024-02828, dated Nov. 29, 2025, 8 pages.

Abe M., et al., "A Signature Scheme with Message Recovery As Secure As Discrete Logarithm," Lam, KY., Okamoto, E., Xing, C. (eds) Advances in Cryptology—ASIACRYPT'99. ASIACRYPT1999, Lecture Notes in Computer Science, 1999, vol. 1716, pp. 378-389.

Akhmetzyanova L., et al., "On Methods of Shortening Elgamal-type Signatures," Cryptology ePrint Archive, Paper 2021/148, Feb. 12, 2021, 35 pages.

International Search Report and Written Opinion for Application No. PCT/IB2024/060094, mailed on Jan. 31, 2025, 15 pages.

Menezes, A.J., et al., "Handbook of Applied Cryptography," CRC Press, Boca Raton, 1997, ISBN-13: 978-0-84-938523-0.

Pornin, "Truncated EdDSA/ECDSA Signatures," Cryptology ePrint Archive, Jul. 19, 2022, 10 pages.

Naccache, et al., "Signing on a postcard," Financial Cryptography: 4th International Conference, FC 2000 Anguilla, British West Indies, Feb. 20-24, 2000 Proceedings 4. Springer Berlin Heidelberg, 2001, 15 pages.

Pollard, "Kangaroos, monopoly and discrete logarithms," Journal of cryptology 13.4, 2000, pp. 437-447.

Lenstra, et al., "Factoring polynomials with rational coefficients," Mathematische annalen 261, 1982, pp. 515-534.

Jainsky, et al., "Authenticating Medications with QR-Codes and Compact Digital Signatures," Cryptology ePrint Archive, 2023, 8 pages.

* cited by examiner

SHORT SIGNATURES AND SHORT AUTHENTICATED SERIAL NUMBERS FOR INTERNET OF THINGS DEVICES

CROSS-REFERENCE TO RELATED APPLICATIONS

This application claims priority to U.S. Provisional Application No. 63/593,328, filed Oct. 26, 2023, which is incorporated by reference in its entirety.

TECHNICAL FIELD

This disclosure relates to systems, methods, and computer-readable media for shortening of digital signatures in comparison to other signatures (e.g., Elliptic Curve Digital Signature Algorithm (EC-DSA) digital signatures).

BACKGROUND

Digital signatures provide the ability to secure communications by ascertaining that a message comes from a specific signer. Digital signatures ascertain that no tampering of the message has occurred after the message has been signed. To do so, a digital signature should be producible only by the signer while being verifiable by all without the knowledge of any secret information of the sender. Digital signature protocols can be divided in two phases: the signature phase and the verification phase, during which a signature can be publicly verified. Progress in technologies related to non-volatile storage capacity of information, security, and circuit technology (for example the advent of cryptographic coprocessors) has resulted in the rapid emergence of the new American Digital Signature Standard (DSS) using one or more digital signature algorithms (DSAs).

The Digital Signature Standard was proposed by the U.S. National Institute of Standards and Technology to provide an appropriate basis for applications requiring digital signatures. A standard digital signature is a pair of large numbers represented in a computer by strings of binary digits. The digital signature is computed with the aid of a series of computational rules (the DSA) and a set of parameters in such a way as to make it possible to certify both the identity of the signatory and the integrity of the data. The standard makes it possible to generate and verify signatures using a framework of public-key cryptosystems to improve the security of generated digital signatures.

In the past there has been attempts to shorten digital signatures by truncation. Those techniques, different from the ones described herein are cited for reference hereafter:

Thomas Pornin, "Truncated EdDSA/ECDSA Signatures", Cryptology ePrint Archive, Paper 2022/938, 2022, https://eprint.iacr.org/2022/938.

Naccache, David and Stern, Jacques, "Signing on a Postcard", Financial Cryptography, 2001, Springer Berlin Heidelberg, pages 121-135.

SUMMARY

The present embodiments relate to systems, methods, and computer-readable media for shortening of digital signatures in comparison to other signatures (e.g., Elliptic Curve Digital Signature Algorithm (EC-DSA) digital signatures). The compression of the signature can be generated using computational operations performed by either of a signing node (e.g., a computing device producing the digital signature)

and/or a verifying node (e.g., a computing device verifying the digital signature). The present embodiment can reduce the length of a digital signature and significantly enhance the identification of devices (e.g., IoT devices) within a network. The present embodiments provide methods that can significantly shorten EC-DSA signatures. The compression comes at a computational cost by the signer and the verifier. The present embodiment can also seek to minimize the space required to store a unique serial number and its signature.

In a first example embodiment, a method for generating a digital signature with a reduced number of bits is provided. The digital signature can be generated with a number of bits (or bytes) less than that of an initial bit length of another digital signature (e.g., a bit length of standard on EC-DSA signatures).

The embodiments can also include sharing, between a signing node (SIG) and a verifying node (VER), a message (M) in which the SIG is to issue a digital signature(S). The method can also include performing, by the SIG, a first number of operations to generate the digital signature S featuring a redundancy (P).

The embodiments can also include generating, by the SIG, a shortened digital signature of S: (S'). Transforming S to S' can include omitting the redundancy. The embodiments can also include transmitting, by the SIG to the VER, the shortened digital signature S'. The verifying node VER can be configured to perform a second number of operations to recover the redundancy P and generate the digital signature S from the shortened digital signature S'. The embodiments can also include verifying, by the verifying node VER, the digital signature S with respect to the message M.

In some instances, the redundancy P is a bit-string of the form $P=X|X$ where X represents any L-bit pattern and $X|X$ stands for the concatenation of X to itself.

In some instances, performing the first number of operations to generate the digital signature further includes searching, by the SIG, a digital signature featuring said redundancy P by re-signing the message M using a randomized digital signature algorithm until a redundancy P appears in the digital signature S.

In some instances, performing the first number of operations to generate the digital signature further includes solving, by the SIG, a mathematical equation involving at least M and the private signature key of SIG to generate the S featuring the redundancy P.

In some instances, the VER is configured to recover the redundancy P to complete S' and subsequently generate S by searching through (e.g. exhaustively searching through all possible) bit values until the S value complying with the redundancy P is found. The S value can be confirmed by a successful cryptographic verification of S.

In some instances, VER is configured to recover the redundancy P to complete S' and subsequently generate S by solving a mathematical equation involving the message M and a public verification key of the SIG.

In some instances, the mathematical equation includes a modified version of an elliptic curve digital signature algorithm (EC-DSA) algorithm. Public parameters of the SIG can include an elliptic curve E and a prime p, as well as a generator G chosen randomly in $\underline{E}$ of some order q. A private key of the SIG can include a number x chosen randomly between 1 and $q-1$ and the public verification key of the SIG is $Y=x\cdot G$.

In some instances, the modified EC-DSA algorithm is characterized by a signature generation and verification process comprising forming, by the SIG, a signature $\{s,R\}$ where $R=k\cdot G$ and $s-(M+(x+a)r)/k \bmod q$, where r is any public bijective encoding of R, wherein a is a number of size 2L bits generated so that s has a size $(\log_2(q))-2L$ bits for the SIG to sign the message M. Verification of the signature {s,R} can include the VER recomputing r from R using said bijective encoding and checking that there exists an a of a relatively moderate size such that $a\cdot G=(s/r)\cdot R-(m/r)\cdot G-Y$.

In some instances, the forming of the signature in the modified version of the EC-DSA algorithm further includes generating a and s by using a Lenstra-Lenstra-Lovasz (LLL) algorithm to solve an equation $sk=M+(x+a)r \bmod q$ for the unknowns s and a, imposing to the LLL algorithm that the relative sizes of s and a are respectively $(\log_2(q))-2L$ and 2L.

In some instances, the forming of the signature in the modified version of the EC-DSA algorithm further includes computing a discrete logarithm of a quantity $(s/r)\ R-(m/r)\cdot G-Y$ with respect to G over the elliptic curve E.

In some instances, the parameter L is comprised between 8 and 80.

In another example embodiment, a system is provided. The system can include a signing node comprising one or more processors and a memory comprising instructions which, when executed by the one or more processors, cause the one or more processors to perform operations. The embodiments can also include performing several operations to generate a random number resulting in a digital signature S of a message M. The digital signature S can include a redundancy P. The embodiments can also include omitting the redundancy P from S to generate a shortened signature S'. The embodiments can also include transmitting M and S' from the signing node to a verifying node.

In some instances, redundancy P is any bit pattern X of size L repeated twice at an end of S, with the digital signature comprising S=S'|X|X where S' is of any form.

In some instances, redundancy P is any bit pattern X of size L repeated twice at a beginning of S, with the digital signature comprising S=X|X|S' where S' is of any form.

In some instances, redundancy P is any bit pattern X of size L repeated once at a beginning of S and one at an end of S, with the digital signature comprising S=X|S'|X where S' is of any form.

In some instances, the redundancy on the X values appearing in S is replaced by f(X), where f is any bijective function.

In some instances, performing several operations to generate the digital signature S of a message M includes using a modified version of an elliptic curve digital signature algorithm (EC-DSA) algorithm. Public parameters of the signing node can include an elliptic curve E and a prime p, as well as a generator G chosen randomly in E of some order q. A private key of the signing node can include a number x chosen randomly between 1 and q−1 and a public key of the signing node is $Y=x\cdot G$.

In some instances, the modified version of the EC-DSA algorithm is characterized by the following signature generation and signature verification processes that can include forming, by the signing node, signature {s,R} where $R=k\cdot G$ and $s=(M+(x+a)r)/k \bmod q$, where r is any public bijective encoding of R, and wherein a is a number of size 2L bits generated so that s has a size $(\log_2(q))-2L$ bits. A verifying node can be configured to verify the signature {s,R} by recomputing r from R using bijective encoding and checking that there exists an a of a relatively moderate size such that $a\cdot G=(s/r)\cdot R-(M/r)\cdot G-Y$.

In some instances, generating a and s is achieved by using a Lenstra-Lenstra-Lovasz (LLL) algorithm to solve equation $sk=M+(x+a)r \bmod q$ for unknowns s and a, imposing to the LLL algorithm that relative sizes of s and a are respectively $(\log_2(q))-2L$ and 2L.

In some instances, verifying the signature is achieved by computing a discrete logarithm of the quantity $(s/r)\ R-(M/r)\cdot G-Y$ with respect to the G over the elliptic curve E.

In some instances, the digital signature is used as authenticated identity numbers to uniquely identify digital or physical objects by the signing node, wherein M is set to a public constant which is signed multiple times to produce multiple authenticated identity numbers.

In some instances, the digital objects are Internet of Things serial numbers used to pair objects within a network.

In some instances, the digital objects are transaction vouchers allowing users to benefit from an on-line service or digital coins having any given value.

In some instances, the physical objects are banknotes, identity documents, and/or keys allowing access to premises.

In some instances, the message M is replaced by a hash value m of the message being signed.

This Summary is provided to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The above and other aspects of the disclosure, its nature, and various features will become more apparent upon consideration of the following detailed description, taken in conjunction with the accompanying drawings, in which like reference characters may refer to like parts throughout, and in which.

DETAILED DESCRIPTION

Figure 1:
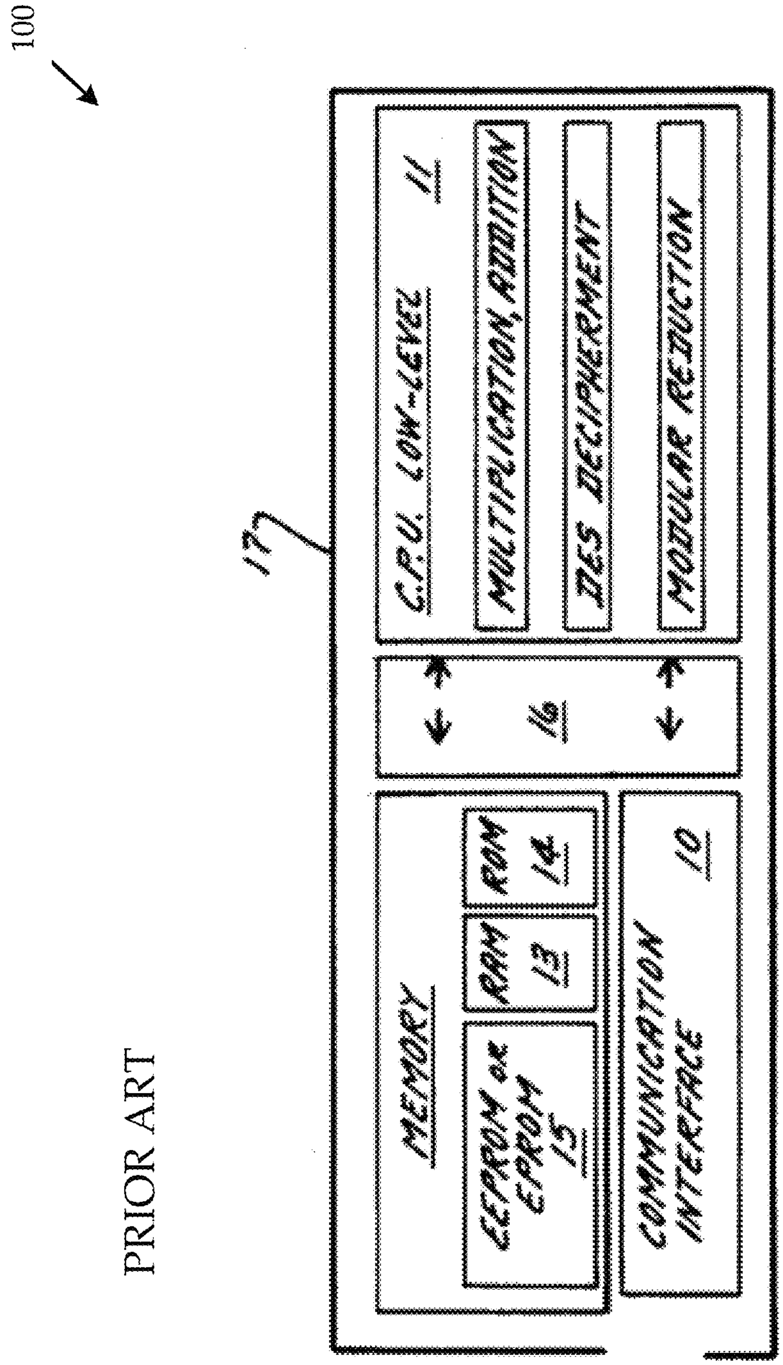
PRIOR ART FIG. 1
FIG. 1 represents a layout of an apparatus able to implement a prior art system.

The present disclosure generally relates to systems and methods allowing to significantly shorten digital signatures in comparison to other signatures (e.g., Elliptic Curve Digital Signature Algorithm (EC-DSA) digital signatures).

While the techniques described herein can be applied to EC-DSA, the present disclosure is not limited to such techniques.

The compressed digital signature can be generated using computational operations performed by any of a signing node (e.g., a computing device producing the digital signature) and/or a verifying node (e.g., a computing device verifying the digital signature). As an illustrative example, the signing node and the verifying node can perform a workload of $2^L$ operations (either one time or two times in a session), where L can include a parameter governing the shortening of the digital signatures as described herein.

The present example embodiments can reduce the length of a digital signature and significantly enhance the identification of devices (e.g., IoT devices) within a network. The present example embodiments can also provide methods allowing the shortening of EC-DSA signatures, where the compression comes at a computational cost by the signing node and/or the verifying node. The present example embodiments can also seek to minimize the space required to store a unique serial number and its signature. For example, the embodiments can allow pairing of IoT devices by typing a minimal length sequence of digits when doing so.

A digital signature can be generated to uniquely identify the signer of the message. The process for generating signatures makes use of a private key to produce a digital signature. The verification process uses a public key corresponding to the secret key. Each user possesses a pair of keys (public, secret). The public keys can be known to everyone, and the secret keys are kept secret. Any entity can have the capacity to verify the signature using the public key of the sender, but signatures cannot be generated other than by using the secret key of the sender. The parameters of the DSA algorithm are:

1) A prime p such that $2^{L-1}<p<2^L$ for $512 \leq L \leq 1024$ and $L=64*\alpha$ for any $\alpha$.

2) A prime q such that $2^{159}<q<2^{160}$ and p−1 is a multiple of q.

3) A number g, or order q modulo p such that $g=h^{(p-1)/q} \bmod p$, where h is any integer satisfying $1<h<p-1$ and $g=h^{(p-1)/q} \bmod p>1$ 4) A number x, generated randomly or pseudo-randomly.

5) A number y defined by the relation: $y=g^x \bmod p$.

6) A number k generated randomly or pseudo-randomly such that $0<k<q$.

The integers p, q, and g can include parameters of the system which may be published and/or shared by a group of users/devices. The secret and public keys of a signatory are x and y, respectively. The parameters x and k are used for the generation of the signature and are kept secret. The parameter k can be regenerated for each signature.

In order to sign a message m (hash value of an initial file M), the signatory computes the signature {r, s} by:

$$r = (g^k \bmod p) \bmod q \text{ and } s = (m + xr)/k \bmod q$$

The division by k can include modulo q (i.e. 1/k is the number k' such that k k'=1 mod q).

For example, if q=5 and k=3 then 1/k=2, since 3×2=6−1 mod 5.

After having tested that $r \neq 0 \neq s$, as explained in the description of the DSA, the signature {r,s} is sent to the verifier which computes:

$$w = 1/s \bmod q \quad 1)$$

2) $u_1=m\ w \bmod q$

3) $u_2=r\ w \bmod q$

4) $v=(g^{u1}\ y^{u2} \bmod p) \bmod q$

5) Compare whether v and r are equal so as to accept or reject the signature.

While some examples relate to an integrated-circuit card, it can be understood that the example could relate to any portable apparatus possessing a microprocessor, a communication interface and storage.

FIG. 1 represents a layout of an apparatus 100 able to implement a prior art system. In FIG. 1, each integrated circuit card can be composed of a processing unit (CPU) 11, a communication interface 10, a random-access memory (RAM) and/or a non-writable memory (ROM) 14 and/or a writable memory (generally overwritable, such as flash memory) 15. The CPU 11 and/or the ROM 14 of the card contain the programs or the computational resources corresponding to the second part of the DSA protocol (computation rules for generating {r,s} and for using the hashing function SHA), multiplication, addition and modular reduction. Some of these operations can be grouped together (for example, modular reduction can be incorporated directly into multiplication). In the same way as for the implementation of the DSA, the RAM memory contains the message M to which the hashing function SHA is applied and the computation rules for generating DSA signatures.

The flash memory 15 contains the parameters p, q, g, and x. The CPU 11 controls, via the address and data buses 16, the communication interface 10, the memory read and write operations 13, 14 and 15. Each integrated circuit card is protected from the outside world by physical protections 17. These protections can be sufficient to prevent any unauthorized entity from obtaining the secret key x.

As described above, a digital signature can allow for secure communications by allowing verification that a message was originated from a specific signer. Digital signatures ascertain that no tampering of the message has occurred after the message has been signed. To do so, a digital signature may be producible only by the signer while being verifiable by all without the knowledge of any secret information of the sender.

Digital signature protocols can be divided into two phases: the signature phase and the verification phase, during which a signature can be publicly verified. For instance, the signature phase can include generating a digital signature by a signing node. Further, the verification phase can include a verifying node verifying the digital signature after transmission of the signature by the signing node.

The digital signatures as described herein can include any of a digital signature algorithm (DSA) signature or an Elliptic Curve Digital Signature Algorithm (EC-DSA) signature. An EC-DSA signature can include public parameters elliptic curve E and prime p. EC-DSA uses a generator $G \in E$ of order q as a system parameter. The private key of the signing node can be $x \in_R Z_q$ and the public key is Y=xG. The signature {s, R} is composed of two parts: R←kG and s←(m+xr)/k mod q.

The value k is a random number, renewed at each signature and x can include the secret key of the signer. The value M can include the Secure Hash Algorithm (SHA) digest of the message to be signed. Here, r can include a digest of R. In many cases, in EC-DSA (unlike DSA) the order of a curve modulo p can be bounded by Hasse's theorem, namely if q is the number of points on E over $Z_p$, then: $|q-(p+1)|\leq 2\sqrt{p}$ In such examples, a value p can be selected such that q>p. In this example, the value r may not need to be the digest of R but actually encodes all the information contained in R.

To verify the signature, a verifying node performs a number of operations to check that:

$$(m/s)G+(r/s)Y=r \text{ indeed,}$$

$$(m/s)G+(r/s)Y=(m/s)G+(xr/s)G=((m+xr)/s)G=kG$$

$$\text{and by defnition } R=kG$$

Further, an algorithm for solving a discrete logarithm problem (e.g., Pollard's Kangaroo Algorithm described in Pollard, John "Kangaroos, Monopoly and Discrete Logarithms", Journal of Cryptology, volume 12, pages 437-447, 2000), which also can be called the λ algorithm, can be utilized. Given $y=\beta^{\alpha} \bmod p$ and β, the algorithm can find a in a complexity of $O(\sqrt{\alpha})$. This algorithm can hereby be denoted by $a\leftarrow\lambda(y, \beta, p)$.

Further, lattice basis reduction algorithm (e.g., Lenstra-Lenstra-a Lovász (LLL) lattice basis reduction algorithm as described in the publication Lenstra, Arjen K. and Lenstra Jr., Hendrik W. and Lovász, László, "Factoring Polynomials with Rational Coefficients", Mathematische Annalen, volume 261, number 4, pages 515-534, 1982, Springer) can be used to distribute modular information.

Let $x_1, \ldots, x_k \in N^*$ be k unknowns. Let $p\in N$ be a modulus and $a_0, \ldots, a_k \in N$ such that $a_0=a_1 x_1+a_2 x_2+\ldots+a_k x_k \bmod p$.

The LLL algorithm can find $x_1, \ldots, x_k$ if $x_1\times x_2\times\ldots\times x_k<p$ In particular, the LLL algorithm can be adapted to provide any uneven split of sizes between the $x_i$ as long as p does not exceed the sum of those sizes. For instance, it is possible to spread the information in the modular equation y+Ax+B=0 mod n by finding a solution x, y where one of the knowns can be of size $(\log_2 n)-\Delta$ bits and the other is Δ bits long and information can be, as an example, spread according to an 80%-20% ratio.

Such digital signature generation and verification can be deployed in various contexts (e.g., an IoT context) and can be beneficial to keep the signature sizes small (as those can be printed on QR codes). Further, internet of things (IoT) networks commonly include a central entity where most of the computational capabilities reside, and end devices which are resource-constrained in memory, processing power, and battery capacity. Although the central entity of an IoT network may bear heavier computation costs, it may not be the case for end devices. Thus, it is beneficial to develop lightweight security solutions which can still ensure a sufficient level of protection.

In the case of digital signatures in an IoT context, it can be desirable to shorten the size of digital signatures to efficiently use data processing and data transmission resources when communicating between IoT devices. Further, it can be desirable to generate secured serial numbers for devices that are as short as possible. The present example embodiments set out to solve the above-mentioned objectives.

In the present example embodiments, a first component can be provided as part of the digital signature to shorten a digital signature by 2L bits. Further, a combination of the first components with a second component can reduce the saved length to L bits but can allow shortening by a further 2L, resulting in a total final saving of 2L−L+2L=3L using the second component. For example, L can be around 40 bits.

The signer can generate $2^L$ elements r and can stop when a specific r is found. The form of the r value can be r'|X|X where X is any L bit string and r' has any form. Because there can be $2^L$ possible X values, in $2^L$ operations, an r value meeting such a form can be found. In some cases, if only the r' value is transmitted to the verifier, the verifier can, using $2^L$ operations, retrieve X and verify the signature. Such steps can give the possibility to shorten a signature by 2L bits at the cost of $2^L$ operations performed by both a signing node and a verifying node.

Figure 2:
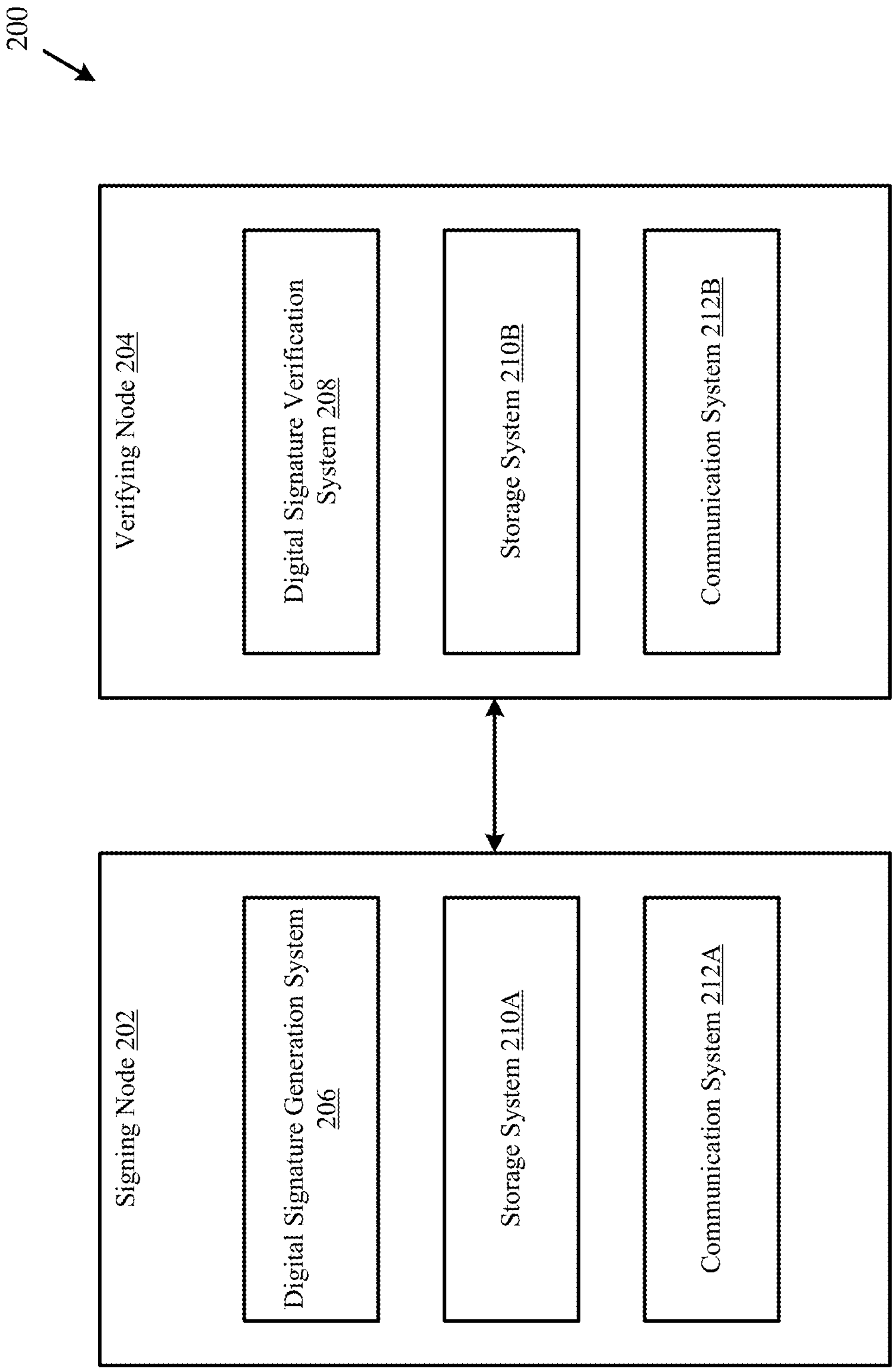
FIG. 2 illustrates an example system including a signing node and a verifying node, according to an example embodiment.

FIG. 2 illustrates an example system 200 including a signing node 202 and a verifying node 204. The signing node 202 can include a computing device generating a message with a digital signature as described herein, and the verifying node 204 can include a computing device capable of receiving the message and verifying the digital signature as described herein.

The signing node 202 can include a digital signature generation system 206. The digital signature generation system 206 can generate a digital signature as described herein. For instance, the digital signature generation system 206 can generate a digital signature with an r shortened by 2L bits using a search (e.g. an exhaustive search). Further, the digital signature generation system 206 can find an r in the form of a value r=r'|X|X. In another example, the digital signature generation system 206 can shorten r by L bits using a search (e.g. an exhaustive search) and shorten s by 2L bits using an LLL algorithm. In another example, the digital signature generation system 206 can generate self-authenticated serial numbers for the signing device 202.

The verifying node 204 can include a digital signature verification system 208 for verifying the digital signature as described herein. For example, the digital signature verification system 208 can perform a number of operations to exhaust X where the verifying node 204 understands r of the digital signature in the form of a value r=r'|X|X. The digital signature verification system 208 can further verify the signature using techniques as described herein. In another example, the digital signature verification system 208 can find a part "a" using Pollard's algorithm and verify the signature using a modified equation.

The signing node 202 and verifying node 204 can also include a storage system 210A-B and communication system 212A-B. The storage systems 210A-B can store various sources of data, such as private keys, public keys, message content, etc. The communication systems 212A-B can facilitate wired and/or wireless communication between devices (e.g., signing node 202 and verifying node 204) using one or more communication techniques.

With a first example embodiment, it can be assumed that the signer and the verifier can perform a workload of $2^L$ operations (once or twice in a session), and L can be the parameter governing the shortening of the signatures obtained as described herein.

A DSA signature can have two parts in it: r and s. The part r may not depend on the signed message but includes a random k generated by the signer. On the other hand, s uses the signed message M. The idea can be to shorten r by changing k (by the signer) until r has the form r'|X|X, where X can be some L-bit pattern. This can require $2^L$ operations. Instead of transmitting r, the device can transmit r' which can be 2L bits shorter.

Upon reception, the verifier can retrieve X by trying all $2^L$ possible values of X. Hence all in all by performing $2^L$ operations at both ends, around 2L storage bits can be saved.

Figure 3:
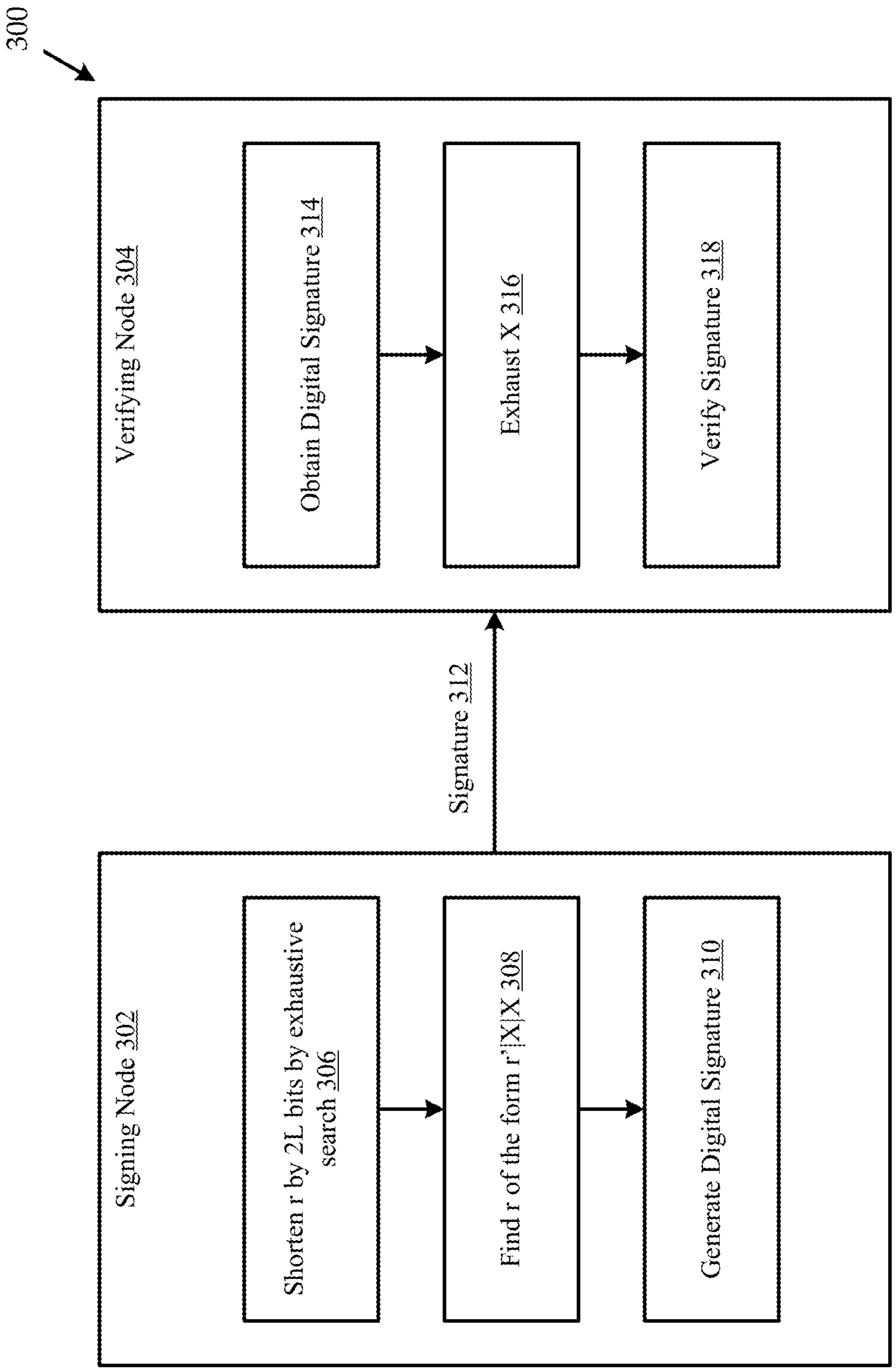
FIG. 3 illustrates an example process for creating a digital signature and verifying the digital signature, according to an example embodiment.

FIG. 3 illustrates an example process 300 for creating a digital signature and verifying the digital signature according to a first example embodiment. As shown in FIG. 3, a signing node 302 can generate a digital signature as part of a message and the verifying node 304 can verify the signature as described herein.

At 306, the signing node 302 can shorten r by 2L bits by a search (e.g. exhaustive search). L can include a parameter governing the shortening of signatures. For example, an initial length of a digital signature can include a specific bit length, and the r part of the digital signature can be shortened by 2L bits, or 2L bits less than the original length of the digital signature.

At 308, the signing node 302 can find r in the form of r'|X|X. The part of the signature r can be shortened by the signing node 302 by changing a value (e.g., k) until r has the form of r'|X|X, wherein X is an L-bit pattern.

At 310, the signing node 302 can generate a digital signature that includes the shortened part r'. The digital signature 312 (along with a message body) can be sent from the signing node 302 to the verifying node 304. At 314, the verifying node 304 can obtain the digital signature with the modified digital signature.

At 316, the verifying node 404 can perform a number of operations to find X. This can include performing operations to try $2^L$ possible values of X. At 318, the verifying node 304 can verify the digital signature using X.

In some instances, as part of linearization, the digital signature's definition can be modified to the following: R←k·G and s←(m+(x+α)r)/k mod q. To check such a signature the verification equation becomes:

$$(m/s).G + (r/s).Y + (r\alpha/s).G = R.$$

In some instances, α is not given and may need to be determined in order to check the signature. To that end the λ algorithm can be used to solve:

$$\alpha.G = \Delta = (s/r).R - (m/r).G - Y.$$

The purpose of α is to shorten s, a short s can be generated using LLL. To do so, when computing:

$$s = (m + (x + \alpha)r)/k \bmod q.$$

The LLL algorithm can be used to generate an α of size 2L and an s of size |q|−2L. When the signature is received, the verifier can run the λ algorithm and check that an α of a relatively moderate size indeed exists. If the signer spends $2^L$ effort on generating a short r and the prover spends an effort of $2^L$ on the λ algorithm, then 3L bits can be saved.

Another example embodiment can be to shorten r by changing k (by the signer) until r has the form r'|0. This can require $2^L$ operations. Instead of transmitting r, r' can be transmitted, which can be L bits shorter.

With signature part s, the idea can be to modify the signature generation formula for s from sk=m+xr to sk=m+(x+a)r. With all parameters fixed except for a and s, an equation of the type sk=C+ar can be used.

The LLL algorithm can be used to find an (s, a) couple that satisfies the above equation with s that can be 2L bits shorter and a part a of size of 2L bits. In sum, the result can be to get an r shortened by L bits and an s shortened by 2L bits. The signature can therefore be globally reduced by 3L bits.

To verify the signature, the verifier may need to know part a. This can be done using an algorithm called Pollard's Kangaroo algorithm, as mentioned above. For example, if L=32 bits (i.e. 4 bytes), a global reduction of 12 bytes can be obtained, which can be significant for a signature whose overall size is around 40 bytes (or 30% of the overall size).

Figure 4:
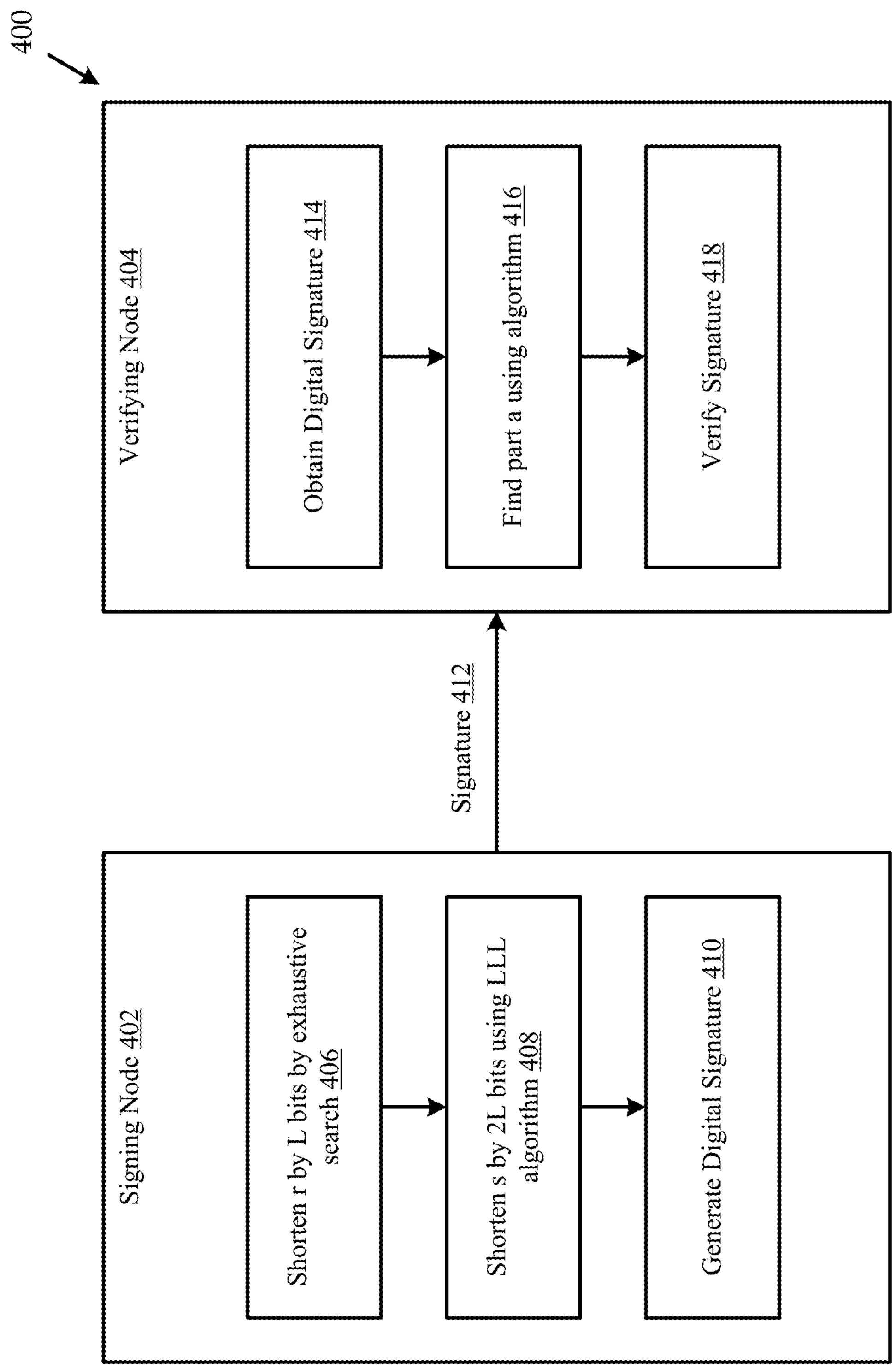
FIG. 4 is an example process for generating and verifying a digital signature, according to an example embodiment.

FIG. 4 is an example process 400 for generating and verifying a digital signature according to a second example embodiment. At 406, the signing node 402 can shorten part r of the digital signature by L bits by performing a search (e.g. an exhaustive search). This can include changing a value until part r has the form of r'|0. This can allow for r' to be L bits shorter than part r.

At 408, the part s can be shortened by 2L bits using an LLL algorithm. As noted above, the LLL algorithm can be used to find an (s, a) couple that includes an s part that is 2L bits shorter than that of an initial digital signature and a part a size of 2L bits.

At 410, the signing node 402 can generate a digital signature using the r, s, and a parts generated as described herein. The digital signature 412 can be sent from the signing node 402 to the verifying node 404. At 414, the verifying node 404 can obtain the digital signature.

At 416, the verifying node 404 can find part a of the digital signature using an algorithm such as Pollard's Kangaroo algorithm. Such an algorithm can be used to solve a discrete logarithm problem in determining part a. At 418, verifying node 404 can verify the signature using the determined part a.

In another example embodiment, serial numbers can be generated with shortened bit lengths that can also be used to authenticate themselves. For instance, DSA can be used, but a constant message can be signed, such as m="sometext" for instance. Because the signatures are randomized, the signature can be used as numbers that can be assigned to a device. In some instances, a validation can be done using a login (device number) and a password. Here the signature can serve both purposes as it can be both a serial number and a signature. Hence this can give particularly short identifiers. The example embodiments as described herein can be used to generate such shorter self-authenticated serial numbers. Those can be much shorter than other solutions, such as those consisting of signing a counter, as there is no message.

An authenticated serial number may be an integer with a length as short as possible, and in which verification is public. A way to achieve such a function can be to pick the serial number u and provide a digital signature σ on u.

In a first example, the process can include m being taken to be the hash value of r. The global size of the resulting signature can be (2 $\log_2(q)$)−3L, for typical parameter choices can suffice to provide enough resistance against the birthday paradox and the resulting numbers can be safely used as short authenticated unique numbers.

In a second example, there can be settings in which the numbers may not be unique but serial. In such a case, the same algorithm can be run v times, each time considering that (for instance) the most significant bits (MSBs) of r represent the serial number. Namely, the expectation of the time T to collect signatures on all n serial numbers can be:

$$E(T) = nH_n = n\log n + \gamma n + 1/2 + O(1/n)$$

where $\gamma \approx 0.5772156649$ (the Euler-Mascheroni constant) and $H_n$ is the Harmonic number.

In any of the example embodiments as described herein, an example EC-DSA signature is 56 bytes long. An example L can be 40 bits (5 bytes). The present example embodiments can allow to reduce a size of the digital signature by about 15/56=26.8%. As a note, some EC-DSA can use 40 byte signatures, in which case the economy is larger, namely 15/40=37.5%.

In a first example embodiment, a method for generating a digital signature with a reduced number of bits is provided. The digital signature can be generated with a number of bits (or bytes) less than that of an initial bit length of another digital signature (e.g., a bit length of standard EC-DSA signatures).

Figure 5:
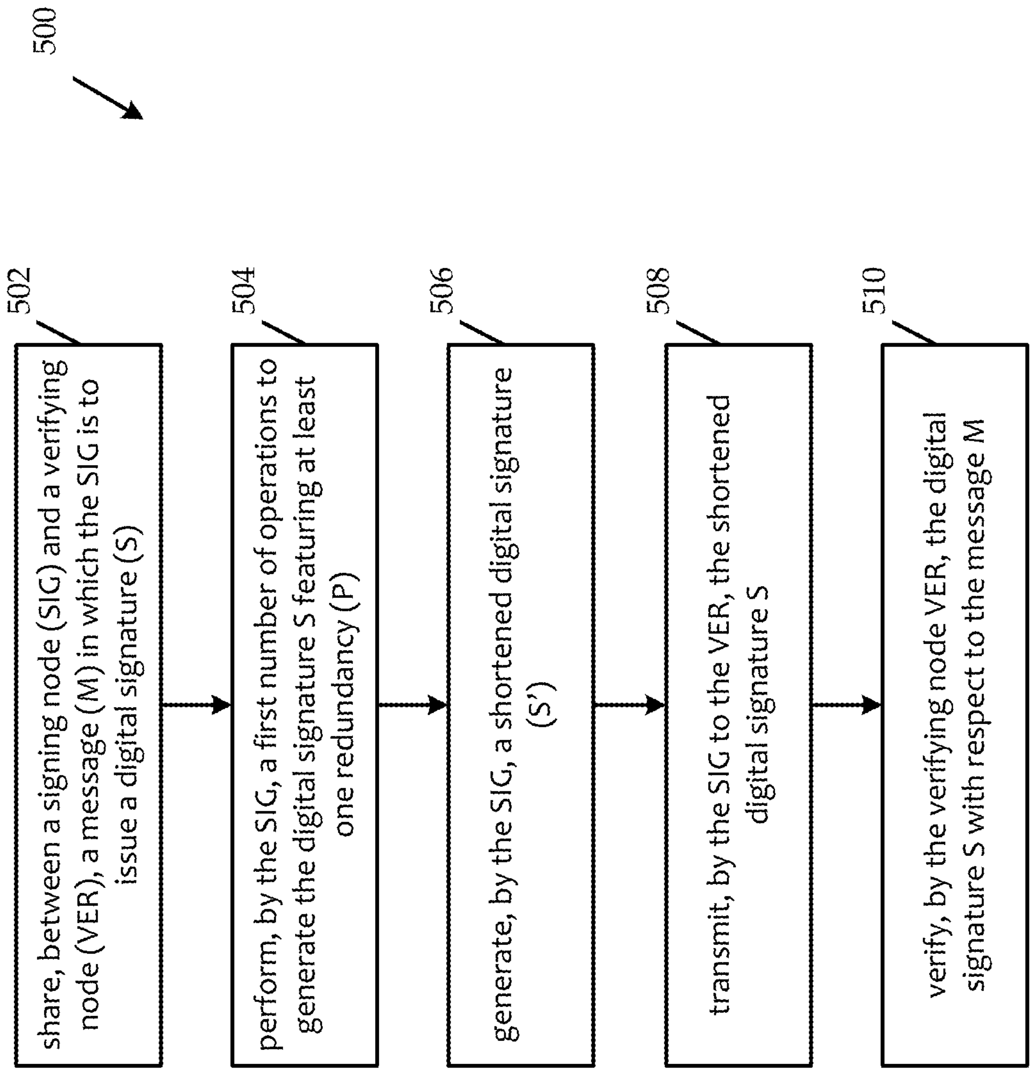
FIG. 5 is a flow process of an example method for generating and verifying a digital signature, according to an example embodiment.

FIG. 5 is a flow process 500 of an example method for generating and verifying a digital signature. At 502, the method can include sharing, between a signing node (SIG) (e.g., 302 in FIG. 3) and a verifying node (VER) (e.g., 304 in FIG. 3), a message (M) in which the SIG is to issue a digital signature(S). The digital signature can authenticate the signing node and can comprise a shortened number of bits, as described herein.

At 504, the method can also include performing, by the SIG, a first number of operations to generate the digital signature S featuring at least one redundancy (P). The operations can be performed by the signing node to generate a digital signature with a redundancy of a particular form that can be omitted prior to transmission to the verifying node.

In some instances, the redundancy P is a bit-string of the form P=X|X where X represents any L-bit pattern and X|X stands for the concatenation of X to itself.

In some instances, performing the first number of operations to generate the digital signature further includes searching, by the SIG, a digital signature featuring said redundancy P by re-signing the message M using a randomized digital signature algorithm until a redundancy P appears in the digital signature S.

In some instances, performing the first number of operations to generate the digital signature further includes solving, by the SIG, a mathematical equation involving at least M and the private signature key of SIG to generate the S featuring the redundancy P.

In some instances, the forming of the signature in the modified version of the EC-DSA algorithm further includes generating a and s by using a Lenstra-Lenstra-Lovasz (LLL) algorithm to solve an equation sk=M+(x+a)r mod q for the unknowns s and a, imposing to the LLL algorithm that the relative sizes of s and a are respectively $(\log_2(q))-2L$ and 2L.

In some instances, the forming of the signature in the modified version of the EC-DSA algorithm further includes computing a discrete logarithm of a quantity (s/r) R−(m/r)·G−Y with respect to G over the elliptic curve E.

In some instances, the parameter L can be a value between 8 and 80.

At 506, the method can also include generating, by the SIG, a shortened digital signature (S'). Transforming the digital signature to the shortened digital signature can include omitting the redundancy.

At 508, the method can also include transmitting, by the SIG to the VER, the shortened digital signature S'. The verifying node VER can be configured to perform a second number of operations to recover the redundancy P and generate the digital signature S from the shortened digital signature S'.

In some instances, the VER is configured to recover the redundancy P to complete S' and subsequently generate S by searching (e.g. an exhaustively searching) through all possible bit values until the S value complying with the redundancy P is found. The S value can be confirmed by a successful cryptographic verification of S.

In some instances, VER is configured to recover the redundancy P to complete S' and subsequently generate S by solving a mathematical equation involving the message M and a public verification key of the SIG.

In some instances, the mathematical equation includes a modified version of an elliptic curve digital signature algorithm (EC-DSA) algorithm. Public parameters of the SIG can include an elliptic curve E and a prime p, as well as a generator G chosen randomly in E of some order q. A private key of the SIG can include a number x chosen randomly between 1 and q−1 and the public verification key of the SIG is Y=x·G.

In some instances, the modified EC-DSA algorithm is characterized by a signature generation and verification process comprising forming, by the SIG, a signature {s,R} where R=k·G and s=(M+(x+a)r)/k mod q, where r is any public bijective encoding of R, wherein a is a number of size 2L bits generated so that s has a size $(\log_2(q))-2L$ bits for the SIG to sign the message M. Verification of the signature {s,R} can include the VER recomputing r from R using said bijective encoding and checking that there exists an a of a relatively moderate size such that a·G=(s/r)·R−(m/r)·G−Y.

At 510, the method can also include verifying, by the verifying node VER, the digital signature S with respect to the message M.

In another example embodiment, a system is provided. The system can include a signing node comprising one or more processors and a memory comprising instructions which, when executed by the one or more processors, cause the one or more processors to perform operations. The operations can include performing several operations to generate a random number k resulting in a digital signature S of a message M. The digital signature S can include a redundancy P. The operations can also include omitting a redundancy P from S to generate a shortened signature S'. The operations can also include transmitting M and S' from the signing node to a verifying node.

In some instances, redundancy P is any bit pattern X of size L repeated twice at an end of S, with the digital signature comprising S=S'|X|X where S' is of any form.

In some instances, redundancy P is any bit pattern X of size L repeated twice at a beginning of S, with the digital signature comprising S=X|X|S' where S' is of any form.

In some instances, redundancy P is any bit pattern X of size L repeated once at a beginning of S and one at an end of S, with the digital signature comprising S=X|S'|X where S' is of any form.

In some instances, the redundancy on the X values appearing in S is replaced by f(X), where f is any bijective function.

In some instances, performing several operations to generate the digital signature S of a message M includes using a modified version of an elliptic curve digital signature algorithm (EC-DSA) algorithm. Public parameters of the signing node can include an elliptic curve E and a prime p, as well as a generator G chosen randomly in E of some order q. A private key of the signing node can include a number x chosen randomly between 1 and q−1 and a public key of the signing node is Y=x·G.

In some instances, wherein the modified version of the EC-DSA algorithm is characterized by the following signature generation and signature verification processes that includes forming, by the signing node, signature {s,R} where R=k·G and s=(M+(x+a)r)/k mod q, where r is any public bijective encoding of R, and wherein a is a number of size 2L bits generated so that s has a size $(\log_2(q))-2L$ bits. A verifying node can be configured to verify the signature {s,R} by recomputing r from R using bijective encoding and checking that there exists an a of a relatively moderate size such that a·G=(s/r)·R−(M/r)·G−Y.

In some instances, generating a and s is achieved by using a Lenstra-Lenstra-Lovasz (LLL) algorithm to solve equation sk=M+(x+a)r mod q for unknowns s and a, imposing to the LLL algorithm that relative sizes of s and a are respectively $(\log_2(q))-2L$ and 2L.

In some instances, verifying the signature is achieved by computing a discrete logarithm of the quantity (s/r)·R−(M/r)·G−Y with respect to the G over the elliptic curve E.

In some instances, the digital signature is used as authenticated identity numbers to uniquely identify digital or physical objects by the signing node, wherein M is set to a public constant which is signed multiple times to produce multiple authenticated identity numbers.

In some instances, the digital objects are Internet of Things serial numbers used to pair objects within a network.

In some instances, the digital objects are transaction vouchers allowing users to benefit of an on-line service or digital coins having any given value.

In some instances, the physical objects are banknotes, identity documents, and/or keys allowing access to premises.

In some instances, the message M is replaced by a hash value m of the message being signed.

In some instances, the digital object is a URL or part of the URL.

In some instances, the digital object is a domain name or part of the domain name.

In some instances, the digital object is a top level domain name (TLD) or part of the TLD.

In some instances, the digital object is an email address or part of the email address.

In some instances, the digital object is a cryptographic key.

In some instances, the digital object is a number used as a source of randomness for generating keys in a cryptographic protocol.

In some instances, the digital object is a number used as a source of randomness for nonces in a cryptographic protocol.

In some instances, the message M is replaced by a hash value m of the message M being signed.

Figure 6:
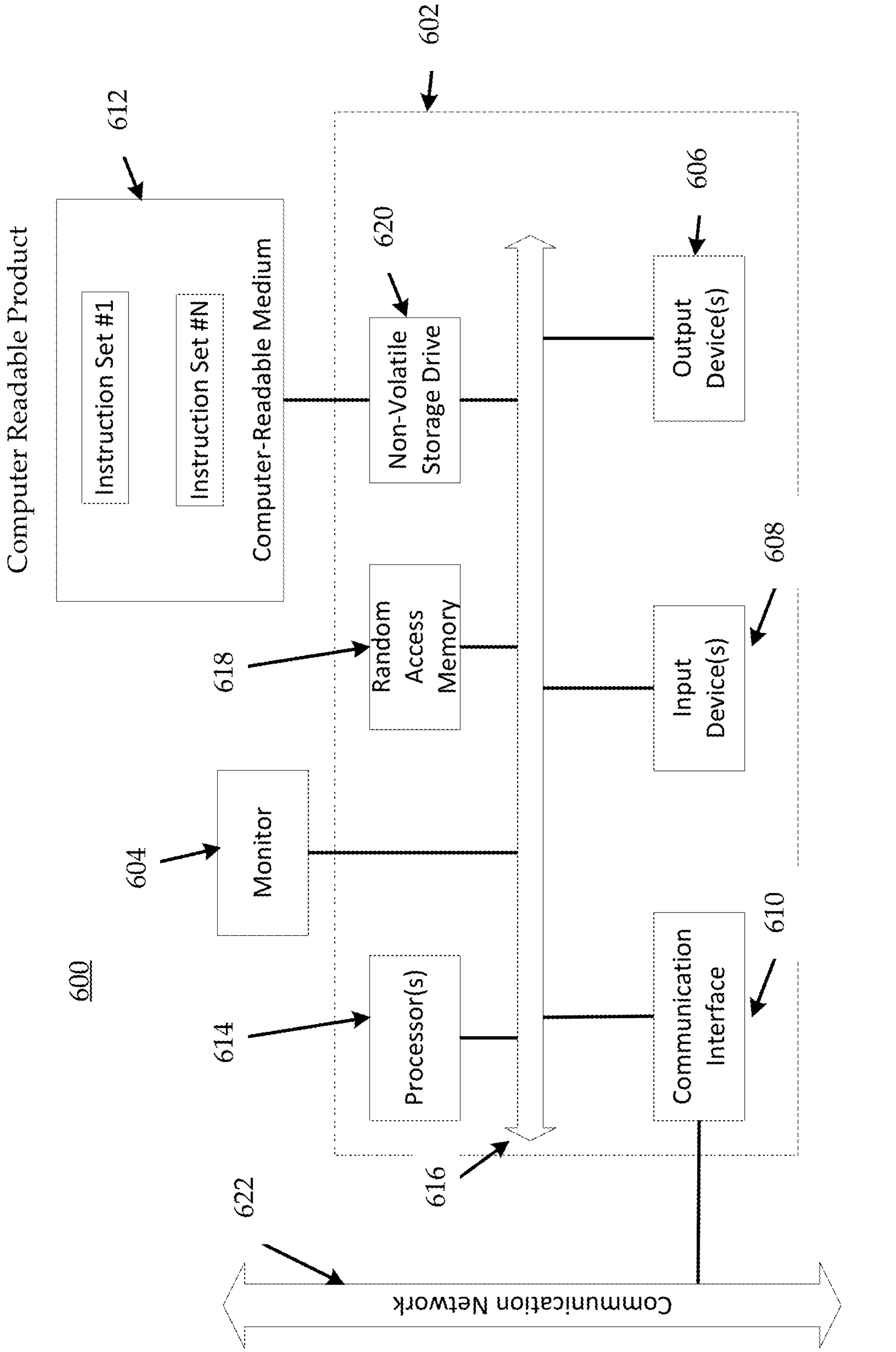
FIG. 6 is a block diagram of a special-purpose computer system, according to an example embodiment.

FIG. 6 is a block diagram of a special-purpose computer system 600 according to an example embodiment. The methods and processes described herein may similarly be implemented by tangible, non-transitory computer readable storage mediums and/or computer-program products that direct a computer system to perform the actions of the methods and processes described herein. Each such computer-program product may comprise sets of instructions (e.g., codes) embodied on a computer-readable medium that directs the processor of a computer system to perform corresponding operations. The instructions may be configured to run in sequential order, or in parallel (such as under different processing threads), or in a combination thereof.

Special-purpose computer system 600 comprises a computer 602, a monitor 604 coupled to computer 602, one or more additional user output devices 606 (optional) coupled to computer 602, one or more user input devices 608 (e.g., keyboard, mouse, track ball, touch screen) coupled to computer 602, an optional communications interface 610 coupled to computer 602, and a computer-program product including a tangible computer-readable storage medium 612 in or accessible to computer 602. Instructions stored on computer-readable storage medium 612 may direct system 600 to perform the methods and processes described herein. Computer 602 may include one or more processors 614 that communicate with a number of peripheral devices via a bus subsystem 616. These peripheral devices may include user output device(s) 606, user input device(s) 608, communications interface 610, and a storage subsystem, such as random-access memory (RAM) 618 and non-volatile storage drive 620 (e.g., disk drive, optical drive, solid state drive), which are forms of tangible computer-readable memory.

Computer-readable medium 612 may be loaded into random access memory 618, stored in non-volatile storage drive 620, or otherwise accessible to one or more components of computer 602. Each processor 614 may comprise a microprocessor, such as a microprocessor from Intel® or Advanced Micro Devices, Inc.®, or the like. To support computer-readable medium 612, the computer 602 runs an operating system that handles the communications between computer-readable medium 612 and the above-noted components, as well as the communications between the above-noted components in support of the computer-readable medium 612. Exemplary operating systems include Windows® or the like from Microsoft Corporation, Solaris® from Sun Microsystems, LINUX, UNIX, and the like. In many example embodiments and as described herein, the computer-program product may be an apparatus (e.g., a hard drive including case, read/write head, etc., a computer disc including case, a memory card including connector, case, etc.) that includes a computer-readable medium (e.g., a disk, a memory chip, etc.). In other example embodiments, a computer-program product may comprise the instruction sets, or code modules, themselves, and be embodied on a computer-readable medium.

User input devices 608 include all possible types of devices and mechanisms to input information to computer system 602. These may include a keyboard, a keypad, a mouse, a scanner, a digital drawing pad, a touch screen incorporated into the display, audio input devices such as voice recognition systems, microphones, and other types of input devices. In various example embodiments, user input devices 608 are typically embodied as a computer mouse, a trackball, a track pad, a joystick, wireless remote, a drawing tablet, a voice command system. User input devices 608 typically allow a user to select objects, icons, text and the like that appear on the monitor 604 via a command such as a click of a button or the like. User output devices 606 include all possible types of devices and mechanisms to output information from computer 602. These may include a display (e.g., monitor 604), printers, non-visual displays such as audio output devices, etc.

Communications interface 610 provides an interface to other communication networks and devices and may serve as an interface to receive data from and transmit data to other systems, WANs and/or the Internet, via a wired or wireless communication network 622. In addition, communications interface 610 can include an underwater radio for transmitting and receiving data in an underwater network. Example embodiments of communications interface 610 typically include an Ethernet card, a modem (telephone, satellite, cable, ISDN), a (asynchronous) digital subscriber line (DSL) unit, a Fire Wire® interface, a USB® interface, a wireless network adapter, and the like. For example, communications interface 610 may be coupled to a computer network, to a FireWire® bus, or the like. In other example embodiments, communications interface 610 may be physically integrated on the motherboard of computer 602, and/or may be a software program, or the like.

RAM 618 and non-volatile storage drive 620 are examples of tangible computer-readable media configured to store data such as computer-program product embodiments of the present disclosure, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 618 and non-volatile storage drive 620 may be configured to store the basic programming and data constructs that provide the functionality of various example embodiments of the present disclosure, as described above.

Software instruction sets that provide the functionality of the present disclosure may be stored in computer-readable medium 612, RAM 618, and/or non-volatile storage drive 620. These instruction sets or code may be executed by the processor(s) 614. Computer-readable medium 612, RAM 618, and/or non-volatile storage drive 620 may also provide a repository to store data and data structures used in accordance with the present disclosure. RAM 618 and non-volatile storage drive 620 may include a number of memories including a main random-access memory (RAM) to store instructions and data during program execution and a read-only memory (ROM) in which fixed instructions are stored. RAM 618 and non-volatile storage drive 620 may include a file storage subsystem providing persistent (non-volatile) storage of program and/or data files. RAM 618 and non-volatile storage drive 620 may also include removable storage systems, such as removable flash memory.

Bus subsystem 616 provides a mechanism to allow the various components and subsystems of computer 602 to communicate with each other as intended. Although bus subsystem 616 is shown schematically as a single bus, alternative embodiments of the bus subsystem may utilize multiple busses or communication paths within the computer 602.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes but is not limited to portable or fixed storage devices, optical storage devices, wireless channels, and/or various other storage mediums capable of storing that contain or carry instruction(s) and/or data.

Whereas many alterations and modifications of the present disclosure will no doubt become apparent to a person of ordinary skill in the art after having read the foregoing description, it is to be understood that the particular example embodiments shown and described by way of illustration are in no way intended to be considered limiting.

Moreover, the processes described above, as well as any other aspects of the disclosure, may each be implemented by software, but may also be implemented in hardware, firmware, or any combination of software, hardware, and firmware. Instructions for performing these processes may also be embodied as machine or computer-readable code recorded on a machine or computer-readable medium. In some example embodiments, the computer-readable medium may be a non-transitory computer-readable medium. Examples of such a non-transitory computer-readable medium include but are not limited to a read-only memory, a random-access memory, a flash memory, a CDROM, a DVD, a magnetic tape, a removable memory card, and optical data storage devices. In other example embodiments, the computer-readable medium may be a transitory computer-readable medium. In such example embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of any one or more of any system, device, or server may be provided as a software construct, firmware construct, one or more hardware components, or a combination thereof, and may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of any one or more of any system, device, or server are merely illustrative, and that the number, configuration, functionality, and interconnection of existing modules may be modified or omitted, additional modules may be added, and the interconnection of modules may be altered.

While there have been described systems, methods, and computer-readable media for enabling efficient control of a media application at a media electronic device by a user electronic device, it is to be understood that many changes may be made therein without departing from the spirit and scope of the disclosure. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the disclosure can be practiced by other than the described example embodiments, which are presented for purposes of illustration rather than of limitation.

What is claimed is:

1. A method for generating and verifying a digital signature, the method comprising:

sharing, between a signing node (SIG) and a verifying node (VER), a message (M) in which the SIG is to issue a digital signature (S);

performing, by the SIG, a first number of operations to generate the digital signature S featuring a redundancy (P);

generating, by the SIG, a shortened digital signature (S'), wherein transforming the digital signature to the shortened digital signature includes omitting the redundancy;

transmitting, by the SIG to the VER, the shortened digital signature S', wherein the VER is configured to perform a second number of operations to recover the redundancy P and generate the digital signature S from the shortened digital signature S', wherein VER is configured to recover the redundancy P necessary to complete S' and subsequently generate S by solving a mathematical equation involving the message M and a public verification key of the SIG, wherein the mathematical equation includes a modified version of an elliptic curve digital signature algorithm (EC-DSA) algorithm, wherein public parameters of the SIG are an elliptic curve E and a prime p, as well as a generator G chosen randomly in E of some order q, and wherein a private key of the SIG is a number x chosen randomly between 1 and q−1 and the public verification key of the SIG is Y=x.G; and verifying, by the VER, the digital signature S with respect to the message M.

2. The method of claim 1, wherein the redundancy P is a bit-string of a form P=X|X where X represents any L-bit pattern and X|X stands for a concatenation of X to itself.

3. The method of claim 1, wherein performing the first number of operations to generate the digital signature further includes:

searching, by the SIG, a digital signature featuring said redundancy P by re-signing the message M using a randomized digital signature algorithm until the redundancy P appears in the digital signature S.

4. The method of claim 1, wherein performing the first number of operations to generate the digital signature further includes:

solving, by the SIG, a mathematical equation involving at least M and a private signature key to generate the S featuring the redundancy P.

5. The method of claim 1, wherein the VER is configured to recover the redundancy P to complete S' and subsequently generate S by exhaustively searching through all possible bit values until the S value complying with the redundancy P is found, and wherein the S value is confirmed by a successful cryptographic verification of S.

6. The method of claim 1, wherein the modified EC-DSA algorithm is characterized by a signature generation and verification process comprising:

forming, by the SIG, a signature {s,R} where R=k.G and s=(M+(x+a)r)/k mod q, where r is any public bijective encoding of R, wherein a is a number of size 2L bits generated so that s has a size $\log_2(q)$−2L bits for the SIG to sign the message M, and wherein verification of the signature {s,R}, includes the VER recomputing r from R using said bijective encoding and checking that there exists an a of a relatively moderate size such that a.G=(s/r).R−(m/r).G−Y.

7. The method of claim 6, wherein the forming of the signature in the modified version of the EC-DSA algorithm further includes generating a and s by using a Lenstra-Lenstra-Lovasz (LLL) algorithm to solve an equation sk=M+(x+a)r mod q for unknowns s and a, imposing to the LLL algorithm that relative sizes of s and a are respectively ($\log_2(q)$)-2L and 2L.

8. The method of claim 6, wherein the forming of the signature in the modified version of the EC-DSA algorithm further includes computing a discrete logarithm of a quantity (s/r) R−(m/r).G−Y with respect to G over the elliptic curve E.

9. The method of claim 6, wherein L is between 8 and 80.

10. A system comprising:

a signing node comprising:

one or more processors; and a memory comprising instructions which, when executed by the one or more processors, cause the one or more processors to perform operations comprising:

performing several operations to generate a random number resulting in a digital signature S of a message M, wherein the digital signature S includes a redundancy P, wherein performing several operations to generate the digital signature S of message M includes using a modified version of an elliptic curve digital signature algorithm (EC-DSA) algorithm, wherein public parameters of the signing node are an elliptic curve E and a prime p, as well as a generator G chosen randomly in E of some order q, wherein a private key of the signing node is a number x chosen randomly between 1 and q−1 and a public key of the signing node is Y=x.G;

omitting the redundancy P from S to generate a shortened signature S'; and transmitting M and S' from the signing node to a verifying node.

11. The system of claim 10, wherein redundancy P is any bit pattern X of size L repeated twice, with the digital signature comprising S=S'|X|X.

12. The system of claim 10, wherein redundancy P is any bit pattern X of size L repeated twice, with the digital signature comprising S=X|X|S'.

13. The system of claim 10, wherein redundancy P is any bit pattern X of size L repeated once at a beginning of S and once at an end of S, with the digital signature comprising S=X|S'|X.

14. The system of claim 13, wherein the redundancy on X values appearing in S is replaced by f(X), where f is any bijective function.

15. The system of claim 10, wherein the modified version of the EC-DSA algorithm further includes:

forming, by the signing node, signature {s,R} where R=k.G and s=(M+(x+a)r)/k mod q, where r is any public bijective encoding of R, and wherein a is a number of size 2L bits generated so that s has a size $(\log_2(q))-2L$ bits, and wherein a verifying node is configured to verify the signature {s,R} by recomputing r from R using bijective encoding and checking that there exists an a of a relatively moderate size such that a.G=(s/r).R−(M/r).G−Y.

16. The system of claim 15, wherein generating a and s is achieved by using a Lenstra-Lenstra-Lovasz (LLL) algorithm to solve equation sk=M+(x+a)r mod q for unknowns s and a, imposing to the LLL algorithm that relative sizes of s and a are respectively $(\log_2(q))-2L$ and 2L.

17. The system of claim 15 wherein verifying the signature is achieved by computing a discrete logarithm of quantity (s/r)R−(M/r).G−Y with respect to the G over the elliptic curve E.

18. The method of claim 1, wherein the first number of operates are performed by the SIG to generate the digital signature S by re-signing the message M using a randomized digital signature algorithm until the redundancy P appears in the digital signature S, wherein the redundancy P comprises a bit-string pattern of a size L that is repeated at least twice in the digital signature.

19. The method of claim 1, wherein the VER is configured to perform the second number of operations to recover the redundancy P and generate the digital signature S from the shortened digital signature S' by searching through possible values of the bit-string pattern until the digital signature S is recovered.

20. The system of claim 10, wherein the performing of several operations to generate a random number resulting in a digital signature S of a message M includes re-signing the message M using a randomized digital signature algorithm until the redundancy P appears in the digital signature S, wherein the redundancy P comprises a bit-string pattern of a size L that is repeated at least twice in the digital signature.

* * * * *